H. M. KEITH.
Seed Sower.
No. 67,122. Patented July 23, 1867.
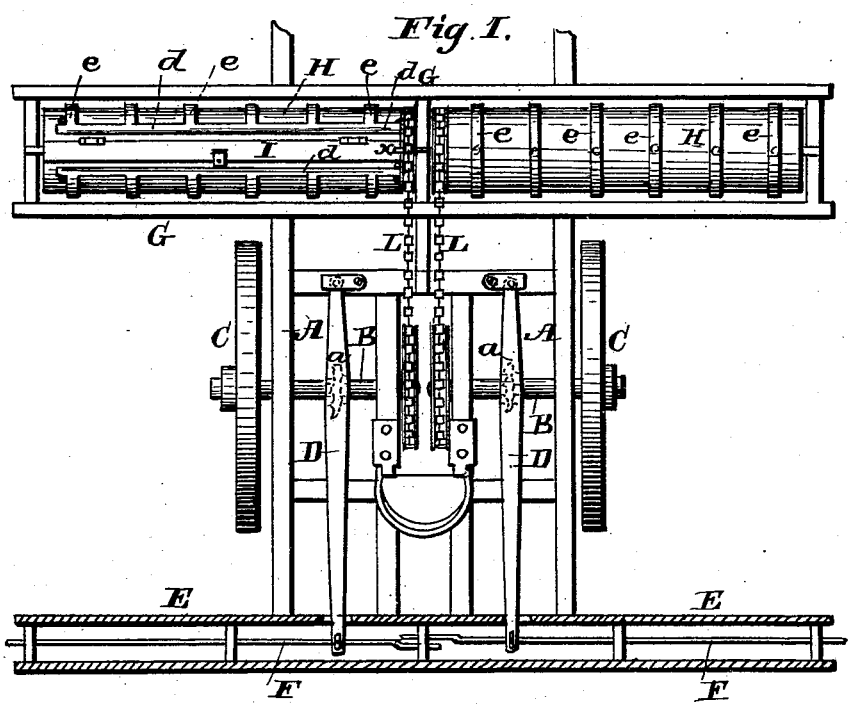
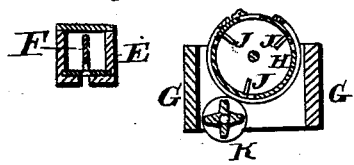

United States Patent Office.

HORACE M. KEITH, OF WEST BLOOMFIELD, ASSIGNOR TO HIMSELF AND T. A. FLOWER, OF OAKLAND COUNTY, MICHIGAN.

*Letters Patent No. 67,122, dated July 23, 1867.*

IMPROVEMENT IN COMBINED FERTILIZER AND SEED-SOWER.

*The Schedule referred to in these Letters Patent and making part of the same.*

TO ALL WHOM IT MAY CONCERN:

Be it known that I, HORACE M. KEITH, of West Bloomfield, in the county of Oakland, and in the State of Michigan, have invented certain new and useful improvements in Combined Fertilizer and Seed-Sower; and do hereby declare that the following is a full, clear, and exact description thereof, reference being had to the accompanying drawings, and to the letters of reference marked thereon.

In the annexed drawings, making part of this specification, A represents the frame of the machine which rests upon a divided axle, B, which said axle is supported upon the wheels C C in the usual manner. Situated upon the rear end of this frame is a seed-box, E, which is provided in its bottom with proper seed openings and a regulating slide. F represents a seed-slide provided with cross-slots on its under side, and which works longitudinally in this seed-box, motion being given to it by means of a lever, D. The levers D D are hinged to the forward portion of the frame, and have on their under side two lugs or pins, between which the corrugated sides of wheels $a\ a$ play to give them motion. The wheels $a\ a$ are secured upon the axles B, and give a lateral reciprocating motion to the outer ends of the levers D D. G represents a box with an open top and bottom, which is secured upon the forward portion of the frame A, and crosswise of said frame. Situated within this box are two cylindrical fertilizing distributers, which have shafts running through them lengthwise, said shafts having their bearings in the ends of the box G and in a centre cross-piece. These cylinders H are provided with doors, I, and with openings through their peripheries through which the fertilizing material is distributed. These openings are protected by a series of bands which partially surround the cylinders, said bands connecting at their ends to the strips $d\ d$ on each side of the doors. The strips $d\ d$ are capable of an endwise movement upon the cylinders, and they, of course, move the bands with them, disclosing or covering the openings in the cylinders as may be necessary. Each of the cylinder-shafts is provided with a loose pulley, and the axle B is provided with two fixed or stationary pulleys. The chains L L pass around these pulleys, as seen, communicating motion from the axle B to the cylinder-pulleys. The cylinder-pulleys are provided with lugs, $x$, which project and catch against pins on the peripheries of the cylinders so as to carry the said cylinders around with them when they revolve. The object of this mode of connection is that the cylinders may be turned back and partially around when the machine is at rest for filling them with fertilizing material. Wings or flanges J J are secured lengthwise of and within the cylinders near the openings through them. These flanges carry up the material to a certain point, when it falls over them to the openings through which it passes to the earth. Beneath the cylinders may be placed a distributing-wheel or roller, K, which may be run by a band and pulley from the cylinders.

Having thus fully described my invention, what I claim as new, and desire to secure by Letters Patent, is—

1. The cylinders H H, revolving in the box G, and carrying fertilizing material for distribution, as is herein specified.

2. The bands $e\ e$ with their strips $d\ d$, in combination with the perforated cylinders H H, as and for the purpose set forth.

3. The wings or flanges J within the perforated cylinders, as and for the purpose set forth.

4. The arrangement of the cylinders H H, chains L L, divided axle B, levers D D, wheels $a\ a$, and the box E with its slides, as and for the purpose set forth.

In testimony that I claim the foregoing I have hereunto set my hand this 7th day of May, 1867.

HORACE M. KEITH.

Witnesses:
A. N. MARR.
M. AXFORD.